(12) United States Patent
Kim et al.

(10) Patent No.: US 12,470,150 B2
(45) Date of Patent: Nov. 11, 2025

(54) CONVERTER AND CONVERTER CONTROL METHOD

(71) Applicant: LG INNOTEK CO., LTD., Seoul (KR)

(72) Inventors: Soo San Kim, Seoul (KR); Kwang Soon Jung, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 250 days.

(21) Appl. No.: 18/037,374

(22) PCT Filed: Nov. 17, 2021

(86) PCT No.: PCT/KR2021/016927
§ 371 (c)(1),
(2) Date: May 17, 2023

(87) PCT Pub. No.: WO2022/108340
PCT Pub. Date: May 27, 2022

(65) Prior Publication Data
US 2023/0421070 A1 Dec. 28, 2023

(30) Foreign Application Priority Data
Nov. 17, 2020 (KR) .................. 10-2020-0153305

(51) Int. Cl.
*H02M 3/335* (2006.01)
*H02M 1/00* (2006.01)
*H02M 7/5387* (2007.01)

(52) U.S. Cl.
CPC ... *H02M 3/33592* (2013.01); *H02M 3/33573* (2021.05); *H02M 1/0048* (2021.05); *H02M 7/53878* (2021.05)

(58) Field of Classification Search
CPC ............. H02M 1/0048; H02M 1/0054; H02M 3/33573; H02M 3/33592; H02M 7/2195; H02M 7/53878
See application file for complete search history.

(56) References Cited

U.S. PATENT DOCUMENTS

2004/0136209 A1* 7/2004 Hosokawa .......... H02M 3/3376 363/24
2011/0075464 A1* 3/2011 Sato .................... H02M 3/3378 363/127

(Continued)

FOREIGN PATENT DOCUMENTS

JP 2011072160 4/2011
JP 2018-516531 6/2018

(Continued)

OTHER PUBLICATIONS

International Search Report dated Mar. 2, 2022 issued in Application No. PCT/KR2021/016927.

(Continued)

*Primary Examiner* — Fred E Finch, III
(74) *Attorney, Agent, or Firm* — KED & ASSOCIATES, LLP

(57) ABSTRACT

A converter according to an embodiment of the present invention comprises: a switching unit including a plurality of switches; a voltage transformer connected to the switching unit; a rectifier switch connected to the voltage transformer; and s sensor connected to a primary coil of the voltage transformer, a secondary coil of the voltage transformer, or the rectifier switch.

17 Claims, 15 Drawing Sheets

(56) References Cited

U.S. PATENT DOCUMENTS

| | | | | |
|---|---|---|---|---|
| 2012/0063175 | A1* | 3/2012 | Wang | H02M 3/33592 363/21.14 |
| 2012/0300520 | A1* | 11/2012 | Ren | H02M 3/33592 363/127 |
| 2020/0336076 | A1* | 10/2020 | Qian | H02M 3/33584 |

FOREIGN PATENT DOCUMENTS

| | | |
|---|---|---|
| KR | 10-2009-0014307 | 2/2009 |
| KR | 10-1396664 | 5/2014 |
| KR | 10-2015-0070898 | 6/2015 |
| KR | 10-2016-0053809 | 5/2016 |

OTHER PUBLICATIONS

Article entitled, "Gate Driving Method for Synchronous Rectifiers in Phase-Shifted Full-Bridge Converter: 9th International Conference on Power Electronics-ECCE Asia: Jae-Il BAEK et al.," dated Jun. 1-5, 2015: 6 pages.

Article entitled, "High-Efficiency and High-Capacity Full-Bridge DC Power Converter using a Simple Voltage-Driven Synchronous Rectifier: Korean Institute of Information Technology: Gang-Youl Jeong," dated Jul. 31, 2016: 12 pages.

Korean Office Action dated Sep. 11, 2023 issued in Application No. 10-2022-0182067.

* cited by examiner

CONVERTER AND CONVERTER CONTROL METHOD

CROSS-REFERENCE TO RELATED PATENT APPLICATIONS

This application is a U.S. National Stage Application under 35 U.S.C. § 371 of PCT Application No. PCT/KR2021/016927, filed Nov. 17, 2021, which claims priority to Korean Patent Application No. 10-2020-0153305, filed Nov. 17, 2020, whose entire disclosures are hereby incorporated by reference.

TECHNICAL FIELD

The present invention relates to a converter, and more particularly, to a converter capable of adaptively reflecting a duty loss in real time.

BACKGROUND ART

A full-bridge converter is a converter that transfers voltage through a transformer by switching four switching elements complementary. The phase shift full bridge converter is a full bridge converter that operates in a phase shift control method, and controls the phase of the switch so that the switching time is overlapped, thereby increasing the size of the current flowing to the secondary side. Through this, zero voltage switching is possible.

However, duty loss may occur due to parasitic inductance or the like, resulting in reduced efficiency. A technology capable of adaptively reflecting duty loss in real time is required.

DETAILED DESCRIPTION OF THE INVENTION

Technical Subject

A technical problem to be solved by the present invention is to provide a converter and a converter control method capable of adaptively reflecting duty loss in real time.

Technical Solution

In order to solve the above technical problem, a converter according to an embodiment of the present invention comprises: a switching unit including a plurality of switches; a voltage transformer being connected to the switching unit; a rectifier switch being connected to the voltage transformer; and s sensor being connected to a primary coil of the voltage transformer, a secondary coil of the voltage transformer, or the rectifier switch.

In addition, the rectifier switch includes a first rectifier switch and a second rectifier switch, and the sensor may measure the drain-source voltage of the first rectifier switch or the drain-source voltage of the second rectifier switch.

In addition, the sensor includes: a first resistor connecting the drain and source of the first rectifier switch; and a second resistor connecting the drain and source of the second rectifier switch, wherein the drain-source voltage of the first rectifier switch or the drain-source voltage of the second rectifier switch may be measured through voltage division using the first resistor or the second resistor.

In addition, the turn-off time of the first rectifier switch or the second rectifier switch may be varied according to a change in voltage of the first rectifier switch or the second rectifier switch received from the sensor.

In addition, the sensor may include a third differential amplifier amplifying and outputting a difference between voltages of both ends of the primary coil of the transformer; and an isolated buffer transferring an output value of the third differential amplifier to the controller.

In addition, the turn-off time of the first rectifier switch or the second rectifier switch may be varied according to a change in voltage of the primary coil of the transformer or a change in voltage of the secondary coil of the transformer being inputted from the sensor.

In addition, it includes a controller controlling the switching operation of the switching unit in a peak current mode, wherein the controller may vary the falling time point of the slope for controlling the peak current mode according to the change in the voltage of the primary coil of the transformer, the secondary coil of the transformer, or the rectifier switch received from the sensor.

In order to solve the above technical problem, a converter according to another embodiment of the present invention comprises: a switching unit; a transformer changing the voltage being outputted from the switching unit; a rectifier switch rectifying the output voltage of the transformer; a sensor sensing the voltage of a primary coil of the transformer, a secondary coil of the transformer, or the rectifier switch; and a controller that controls the converting operation of the converter, wherein the rectifier switch is turned off according to the rising or falling time point of the voltage of the primary coil of the transformer, the secondary coil of the transformer, or the rectifier switch.

In addition, the controller calculates in a period of a first time, and when the sensing time point of the sensor is changed according to the size change of the load being electrically connected to the rectifier switch, the on/off state change time point of the rectifier switch may also be changed within the first time.

In addition, the rectifier switch may be turned on when a synchronized switch among switches included in the switching unit is turned on.

In addition, the rectifier switch includes a first rectifier switch and a second rectifier switch being connected in parallel to each other, the secondary coil of the transformer includes a first coil being connected in series with the first rectifier switch and a second coil being connected in series with the second rectifier switch, and the sensor may measure at least one voltage of the voltage of the first coil and the voltage of the second coil.

In addition, the sensor may include: a first differential amplifier amplifying the voltage difference between both ends of the first coil and applying the amplified voltage to the controller; and a second differential amplifier for amplifying the voltage difference between both ends of the second coil and applying the amplified voltage to the controller.

In addition, the controller controls the switching operation of the switching unit in a peak current mode by measuring the voltage and input current of the load, but the falling time point of the slope for controlling the peak current mode can be varied according to the change in the voltage of the first rectifier switch or the second rectifier switch received from the sensor.

In addition, the controller controls the switching operation of the switching unit in a peak current mode by measuring the voltage and input current of the load, but the falling time point of the slope for controlling the peak current mode can be varied according to the change in the voltage of the primary coil of the transformer, the secondary coil of the transformer, or the rectifier switch received from the sensor.

In addition, the controller may vary the turn-off time of the rectifier switch according to voltage change inputted from the sensor and the primary coil of the transformer, the secondary coil of the transformer or the rectifier switch.

In order to solve the above technical problem, a control method of a converter according to an embodiment of the present invention, in a control method of a converter including a transformer and a rectifier switch electrically connected to the transformer, the control method comprises the steps of: transforming an input voltage into a voltage of a predetermined level through a first period operation; detecting a voltage of the transformer or the rectifier switch unit; and rectifying an output voltage being outputted, wherein switching operation state of the rectifier switch is controlled within the first period from a rising time point or a falling time point of the voltage that has been detected.

Advantageous Effects

According to embodiments of the present invention, efficiency of a converter may be increased by adaptively reflecting a duty loss in real time.

BEST MODE

Hereinafter, preferred embodiments of the present invention will be described in detail with reference to the accompanying drawings.

However, the technical idea of the present invention is not limited to some embodiments to be described, but may be implemented in various forms, and inside the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under) ", the meaning of not only an upward direction but also a downward direction based on one component may be included.

Figure 1:
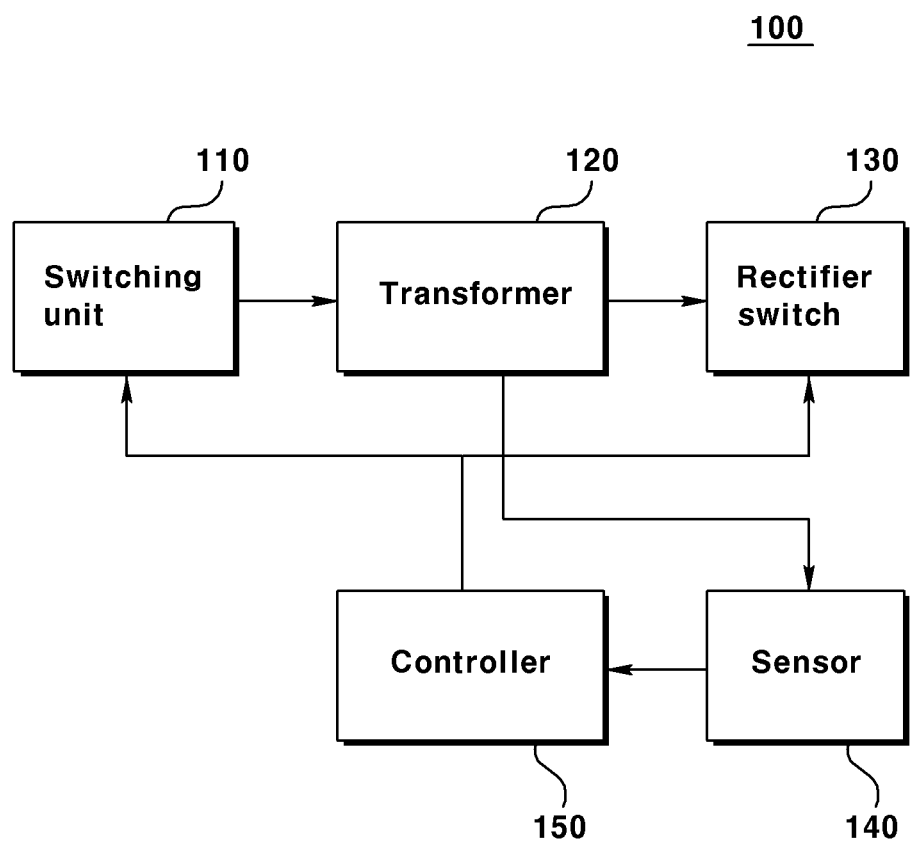
FIG. 1 is a block diagram of a converter according to an embodiment of the present invention.
Figure 7:
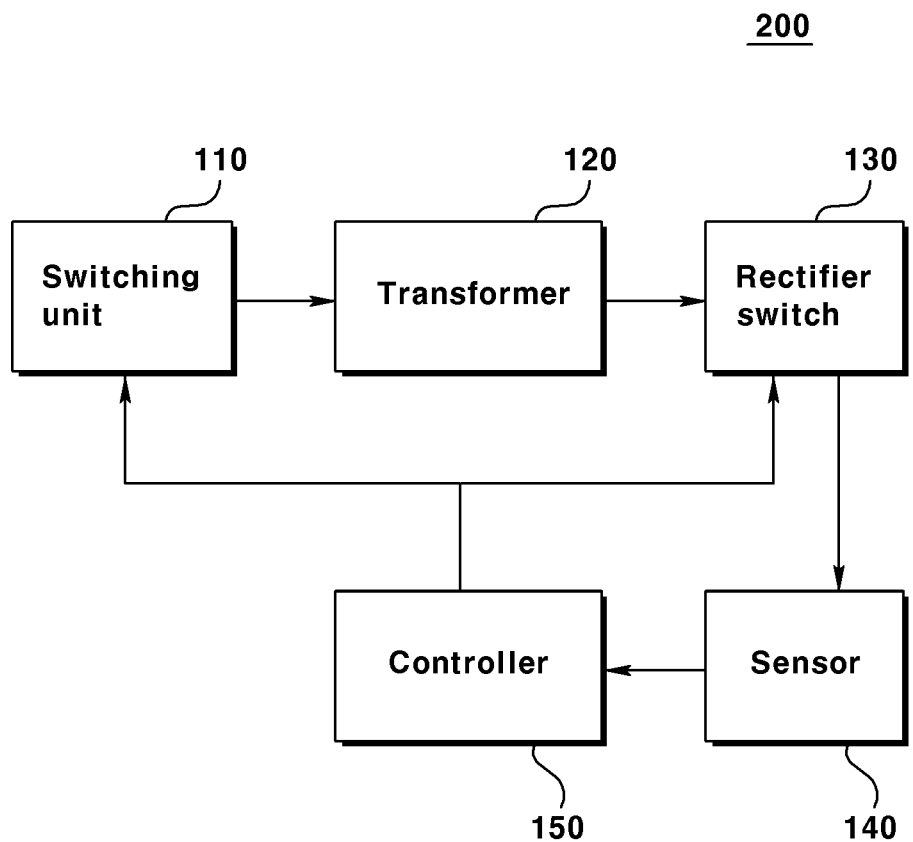
FIG. 7 is a block diagram of a converter according to another embodiment of the present invention.
Figure 11:
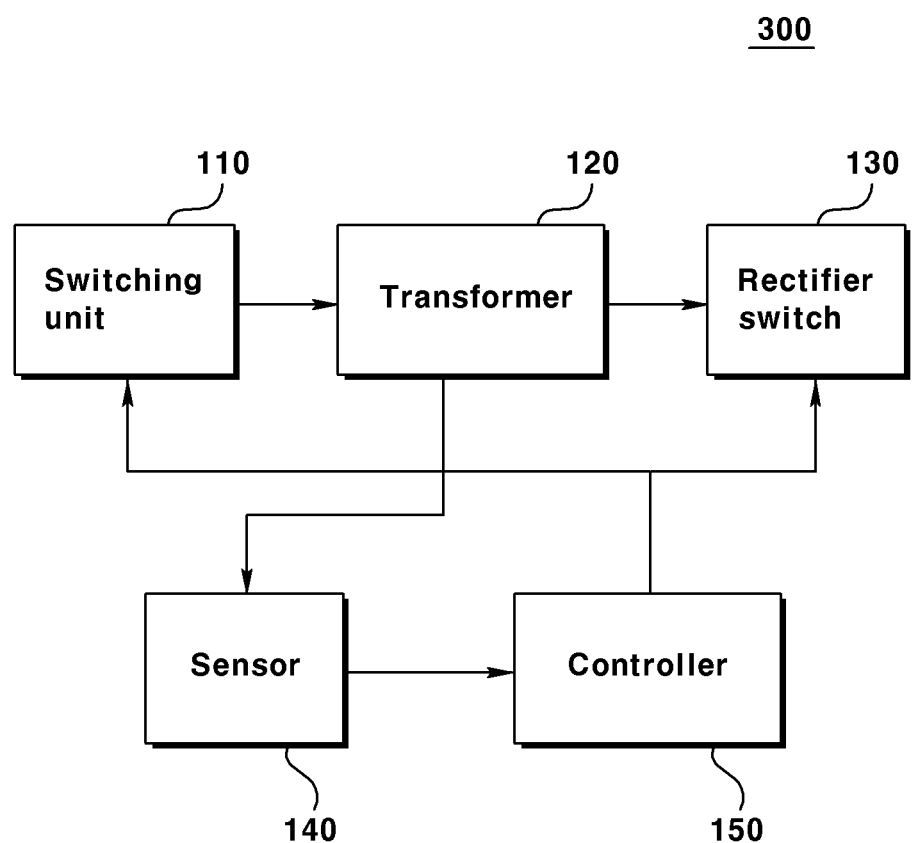
FIG. 11 is a block diagram of a converter according to yet another embodiment of the present invention.

A converter according to an embodiment of the present invention comprises a switching unit including a plurality of switches, a transformer being connected to the switching unit, a rectifier switch being connected to the transformer, and a sensor being connected to a primary coil of the transformer, a secondary coil of the transformer, or a rectifier switch. The sensing position of the sensor may vary as shown in FIGS. 1, 7, and 11. Hereinafter, each embodiment will be described in detail.

FIG. 1 is a block diagram of a converter according to an embodiment of the present invention.

A converter 100 according to an embodiment of the present invention comprises a switching unit 110, a transformer 120, a rectifier switch 130, a sensor 140, and a controller 150, and it may include a load measurement unit (not shown) and an input measurement unit (not shown).

The switching unit 110 includes a plurality of switches. It includes a plurality of upper switches and a plurality of lower switches, and may perform a phase shift operation.

More specifically, the switching unit 110 outputs the input power to the primary side of the transformer 120, and comprises a plurality of upper side switches and a plurality of lower side switches to perform a phase shift operation. The switching unit 110 comprises a first upper switch and a first lower switch conducting complementarily and a second upper switch and a second lower switch conducting complementarily, and may form a full bridge. Here, the first upper switch and the first lower switch, the second upper switch and the second lower switch may respectively form a half bridge, and the two half bridge circuits may form a full bridge. The switching unit 110 may be controlled with a peak current mode (PCM).

When the phase shift does not operate, the first upper switch and the second lower switch are turned on and off together, and the second upper switch and the first lower switch are turned on and off together, but through phase shift control, the first upper switch and the second lower switch are turned on and off together, the upper switch may be turned on together, or a section in which the first lower switch and the second lower switch are turned on together is made so that more current in the primary side passes over to the secondary side. The converter 100 according to an embodiment of the present invention may be a phase shift full bridge converter.

The time during which the first upper switch and the second lower switch are simultaneously turned on or the time during which the first lower switch and the second upper switch are simultaneously turned on is referred to as a duty. The duty of the converter may mean an operating time ratio per period in which energy is transferred from the primary side of the transformer to the secondary side, and the duty of the switch may mean a ratio per period in which the switch is turned on. The duty of the converter, that is, the time during which the first upper switch and the second lower switch simultaneously maintain on or the time during which the first lower switch and the second upper switch maintain on at the same time, varies according to the current flowing through the load.

Duty loss may occur due to parasitic inductance and the like included in the converter 100, and when duty loss occurs, efficiency of transition from the primary side to the secondary side may decrease. Here, the duty loss time may vary according to the current flowing in the load. The duty or duty loss of the switching unit 110 will be described in detail later.

The transformer 120 is connected to the switching unit 110. The transformer 120 outputs the output voltage of the switching unit 110 as a voltage of a predetermined level.

More specifically, the voltage being outputted from the switching unit 110 is inputted to the primary side, and the voltage of the level according to the winding ratio of the primary coil and the secondary side is outputted to the secondary side. The transformer 120 further includes a tertiary side coil and may transfer the primary side voltage to the secondary side and the tertiary side. The secondary and tertiary sides may have a different or an equal turn ratio. The transformer 120 may be inputted with the output voltage of the switching unit 110 through a leakage inductor. Zero voltage switching of the switching unit 110 is possible by forming the leakage inductor, but duty loss may occur due to the leakage inductor. The effect of duty loss due to the leakage inductance or parasitic inductance of the leakage inductor will be described later in detail.

The rectifier switch 130 rectifies the output of the transformer 120 and transfers it to a load.

More specifically, one or more rectifier switches 130 rectify the signal being outputted to the secondary side of the transformer 120 and transfer it to a load. The rectifier switch 130 may be a MOSFET switch or another type of switching element. The rectifier switch 130 may rectify the output of the transformer 120 together with the inductor and capacitor and output it to a load. The rectifier switch 130 may include a first rectifier switch and a second rectifier switch. The coil of the secondary side of the transformer may include a first coil and a second coil, and the first rectifier switch may be connected between the (+) terminal of the first coil 122-1 and the ground, and the second rectifier switch may be connected between the (−) terminal of a second coil 122-2 and the ground. The first rectifier switch can be turned on and off in synchronization with the first lower switch and the second upper switch of the switching unit 110, and the second rectifier switch may be turned on and off in synchronization with the first upper switch and the second lower switch of the switching unit 110. Currents flowing through the first rectifier switch and the second rectifier switch may be combined and transferred to the load through the inductor. At this time, an output capacitor forming an inductor and a rectifying filter may be connected to the load side.

The sensor 140 measures the voltage of the secondary coil of the transformer 120.

More specifically, in detecting the duty loss, the voltage of the secondary coil of the transformer 120 may be used. For this purpose, the sensor 140 measures the voltage of the secondary coil of the transformer 120. The rectifier switch unit 130 includes a first rectifier switch and a second rectifier switch being connected in parallel to each other, the sensor 140 may measure the voltage of the first coil 122-1 on the secondary side of the transformer connected in series with the first rectifier switch unit and the second coil 122-2 on the secondary side of the transformer being connected in series with the second rectifier switch unit.

Figure 2:
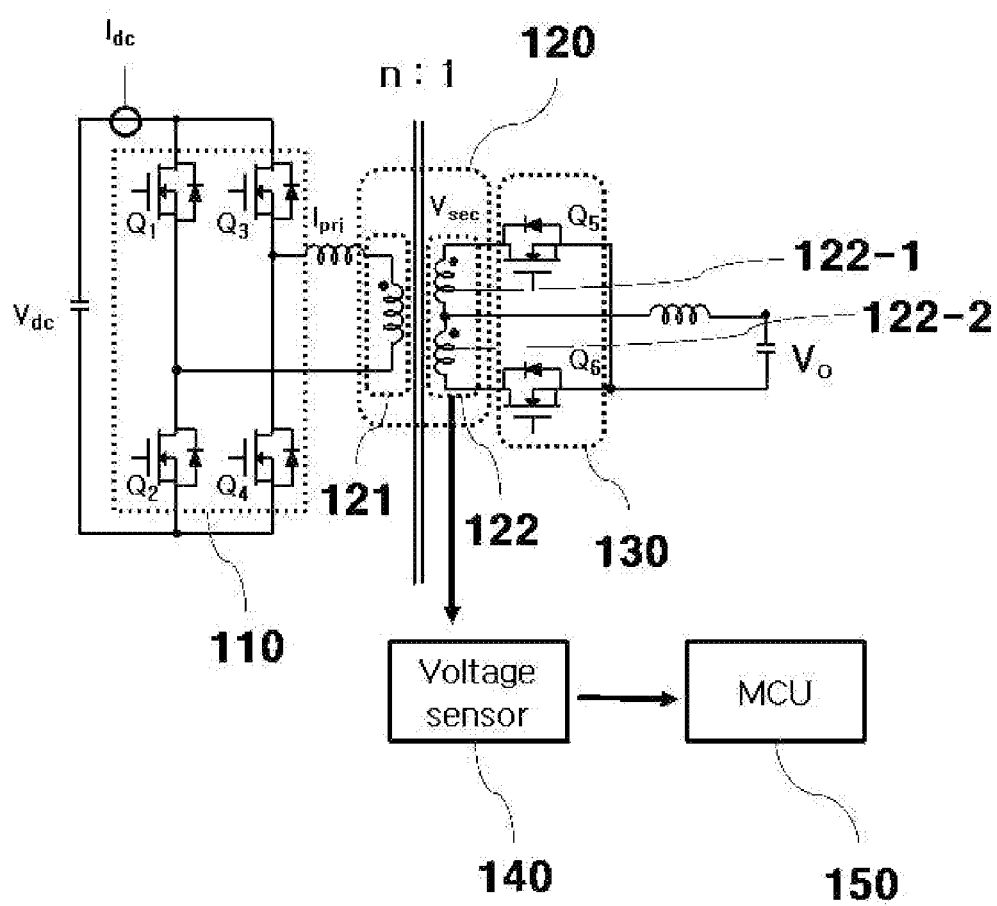
FIG. 2 is an exemplary circuit diagram of a converter according to an embodiment of the present invention.
Figure 3:
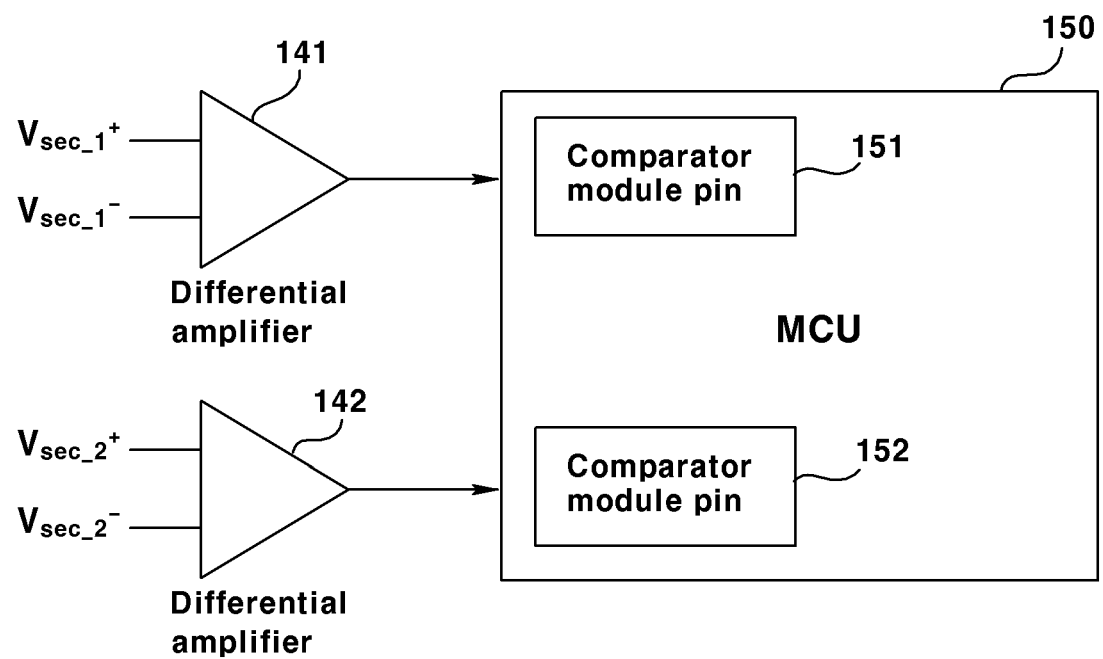
FIG. 3 is a block diagram of a sensor and controller according to an embodiment of the present invention.

As shown in FIG. 2, the rectifier switch 130 may be configured with a first rectifier switch Q5 and a second rectifier switch Q6 being connected in parallel, and the sensor 140 is formed as a voltage sensor and can measure the voltage of the first coil 122-1 or the second coil 122-2. The measured voltage may be applied to the MCU which is the controller 150. The sensor 140 may include a first differential amplifier 141 amplifying the difference between the voltages of both ends of the first coil 122-1 and applying it to the controller 150, and a second differential amplifier 142 for amplifying the difference between the voltages of both ends of the second coil 122-2 and applying it to the controller 150. As shown in FIG. 3, the voltages across the both ends of the first coil 122-1, Vsec_1+ and Vsec_1−, are measured, and the voltage being generated across the first coil 122-1 through the first differential amplifier 141 that amplifies the difference between the voltages of both ends may be applied to the MCU 150, which is a controller. A differential amplifier is an amplifier that amplifies and outputs the difference between the two inputs being inputted to the (+) input terminal and the (−) input terminal to a preset gain, and the MCU 150 can detect the voltage being generated in the first coil 122-1 right away even with a small difference in the input stage of the first differential amplifier 141. The sensor 140 measures the voltages across the both ends of the second coil 122-2, Vsec_2+ and Vsec_2−, and can apply the voltage being generated across the first coil 122-1 through the second differential amplifier 142 to the MCU 150, which is a controller. The MCU 150 may be inputted with the outputs of the first differential amplifier 141 and the second differential amplifier 142 through comparator module pins 151 and 152.

As described above, when the switching unit 110 phase shifts, duty loss may occur. Here, the duty loss may be referred to as duty ratio loss or switching loss.

Figure 4:
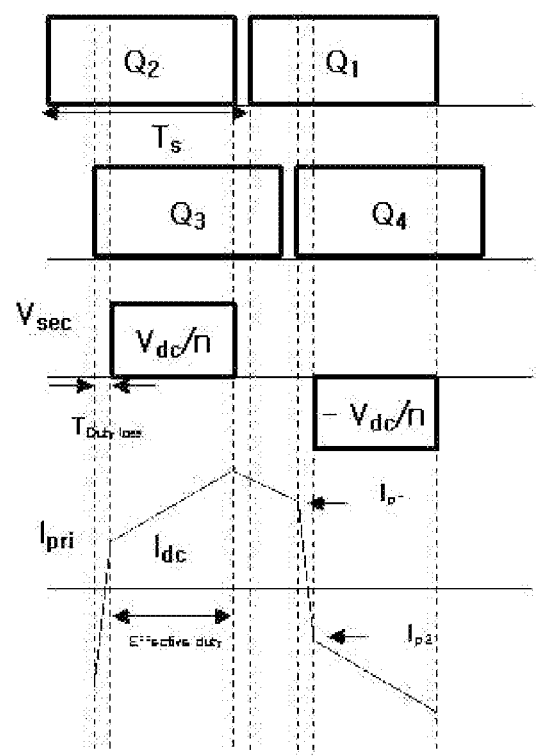
FIGS. 4 to 6 (B) are diagrams for explaining a process of reflecting a duty loss of a converter in real time according to an embodiment of the present invention.

Referring to FIGS. 2 and 4, in a full-bridge circuit configured with Q1, Q2, Q3, and Q4 in the switching unit 110, duty means the time when Q1 and Q4 are on at the same time, or the time when Q2 and Q3 are on at the same time. During the duty time, power must be transferred from the primary side of the transformer 120 to the secondary side, but in case of duty loss, it may be impossible to transfer power for the entire duration of the duty time. That is, when duty loss occurs, an effective duty time performing an effective operation out of the entire duty time may be reduced.

In the period where Q4 is off and Q3 is on while Q2 and Q4 are on, or in the period where Q3 is off and Q4 is on while Q1 and Q3 are on, duty loss may occur.

In the corresponding period, the current flowing through Q6 from the current flowing through Q5, or the current through Q6 to the current through Q5, current will change, and in this period, if current flows from Q5 or Q6 to the diode, not the FET, the voltage across the both ends of the secondary coil of the transformer becomes 0 V, and as 0 V is reflected in Vpri, the primary side voltage of the transformer where Vdc should come out comes out as 0 V. That is, at the moment when Q2 and Q3 are turned on at the same time, 0 V, not Vdc, is applied to the primary side voltage Vpri of the transformer, and a duty loss period is formed until the time Vdc is applied to Vpri. When the duty loss period is elapsed, Vdc is applied to Vpri, and the voltage of the secondary coil of the transformer, is induced to Vdc/n. depending on the transformer's transformation ratio, Vsec. That is, the duty loss may mean a duty rate of 0 V during a specific time (duty loss) since a voltage Vdc or −Vdc is applied across the primary side of the transformer at the overlapping portion of Q1 and Q4 or Q2 and Q3, accordingly, then the voltage at both ends of the primary coil of the transformer must induce Vdc/2 or −Vdc/2 voltage.

For example, in a situation where Q2 and Q3 are turned on and current flows through Q5 through I_pri to transfer power to the secondary side, Q1 and Q4 are turned on so that duty loss occurs in the process of changing the current from Q5 to Q6, and at this time, the slope of the changing current is determined by the parasitic inductance L_r of the transformer. Therefore, the larger the value of the parasitic inductance L_r, the smaller the slope of the current, and accordingly, the time it takes for the current to change will increase so that the time of duty loss becomes longer.

When duty loss occurs, the efficiency of transferring power from the primary side to the secondary side decreases, and heat is increased in the FET, causing many problems in that the heat sink must become large.

The duty loss may be calculated from the parasitic inductor of the transformer 120, the input voltage, the switching period of the switching unit 110, and the current flowing through the load. The duty loss can be calculated from the following equation calculating the effective duty D_eff.

$$D_{eff} = \frac{V_o}{nV_I} = D - \frac{4nL_rI_L}{V_IT_S}$$ [Equation 1]

$$Dutyloss = \frac{4nL_rI_L}{V_IT_S}$$

Here, Deff is the effective duty, Vo is the output voltage, n is the turn ratio, D is the duty, Lr is the inductance of the parasitic inductor of the transformer, VI is the input voltage, Ts is the switching period (inversely proportional to the frequency), and IL is the load-side current.

In addition, duty loss can be defined as follows.

$$Dutyloss(\Delta D) = \frac{n}{\frac{V_{dc}}{L_r}T_s}\left(2I_L - \frac{V_o}{L_o}(1-D)T_s\right)$$ [Equation 2]

The duty loss is greatly affected by Lr and Lo, which vary greatly by current or temperature. That is, in calculating the duty loss, when the values of Lr and Lo applied in the previous period are applied to the next period, an error may occur at a specific timing due to the change in Lr and Lo. The change in inductance is large according to the current value, and the change in magnetic permeability is large according to the temperature. In addition, inductance, which is proportional to magnetic permeability, also changes with temperature. In order to reflect this, inductance values according to current or temperature values can be tabulated and used. It can be easily implemented through software without additional circuitry by using a lookup table. However, for this, current or temperature must be measured, and a certain amount of time is required to reflect it. That is, after measuring the current and temperature at each period, it is reflected in the next period so that the application of the measured value is delayed by more than one period, and accordingly, it is difficult to accurately reflect the duty loss in real time.

The converter according to an embodiment of the present invention may detect the time point at which the duty loss ends only by measuring the voltage without calculating and using the duty loss.

The time point at which the duty loss ends can be detected through the voltage of the secondary coil of the transformer 120. The voltage of the secondary coil 122 may be detected or the voltage of the first coil 122-1 or the second coil 122-2 comprising the secondary coil may be detected. The voltage applied to the secondary coil of the transformer is shown in FIG. 4. After Q2 and Q3 are turned on, a voltage is induced in the secondary coil at the time point at which the duty loss ends. At this time, the secondary coil voltage Vsec becomes Vdc/n by the voltage Vdc being inputted to the primary coil by the turn ratio n of the transformer. When Q2 and Q3 are on, voltage is applied to the primary side of the transformer in the direction from Q3 to Q2, and accordingly, a voltage is induced in the second coil 122-2, and at this time, the voltage of the second coil 122-2 becomes Vdc/n. After Q1 and Q4 are turned on, a voltage is induced in the secondary coil at the time point at which duty loss ends. When Q1 and Q4 are on, voltage is applied to the primary side of the transformer in the opposite direction from Q1 to Q4, that is, from Q3 to Q2. Accordingly, a voltage is induced in the first coil 122-1, and at this time, the voltage of the first coil 122-1 becomes −Vdc/n. That is, since the voltage on the secondary side of the transformer becomes Vdc/n or −Vdc/n at the time point at which the duty loss ends, the time point at which duty loss ends can be accurately detected by detecting the time point (edge) at which the voltage on the secondary side of the transformer rises from 0 V to Vdc/n, or by detecting the time point (edge) when the voltage on the secondary side of the transformer drops from 0 V to −Vdc/n.

The controller 150 is inputted with the voltage of the secondary coil of the transformer 120 from the sensor 140, and generates a control signal controlling the switching unit 110 or the rectifier switch 130 according to the change in the voltage of the secondary coil of the transformer.

More specifically, the controller 150 controls the switching unit 110 and the rectifier switch 130 to convert the voltage inputted to the converter into a voltage of a predetermined level through a transformer and output it to a load. The controller 150 may measure the voltage and input current of the load to control the switching operation of the switching unit 110 in a peak current mode. At this time, the controller 150 may control the converting operation of the converter through a first period operation. Here, the first period is a period having a first time period, and the controller 150 may repeat the operation every period of the first period. Here, the first period may be set or changed by design specifications of the converter, such as input voltage and transformation ratio, or by the user.

The controller 150 may be implemented as a microcontroller, that is, an MCU. The voltage of the load is measured using the sensor 140, the input current is measured using the current sensor, and generates a pulse width modulation signal that controls the switching operation of the switching unit 110 in a peak current mode using the measured load voltage and input current. A pulse width modulation (PWM) signal may be generated by a PWM generation unit. The generated pulse width modulation signal is inputted to the gate of each switch to control the switching operation. Specifically, the load-side voltage is received and converted into a digital value through an analog-digital converter (ADC), the difference between the reference voltages Vref is calculated to input the result to the voltage compensator, and based on the result, a reference value Vref_i is calculated. The digital slope compensation unit sets a slope Vslope to be used to generate PWM according to the corresponding value. Thereafter, by applying a slope to the current measured by the comparator, the controller may generate a PWM signal until the current is equal to the reference value. The PWM signal is applied to the gate of each switch of the switching unit 110 through the PWM gate driver to control on/off of each switch.

Figure 5:
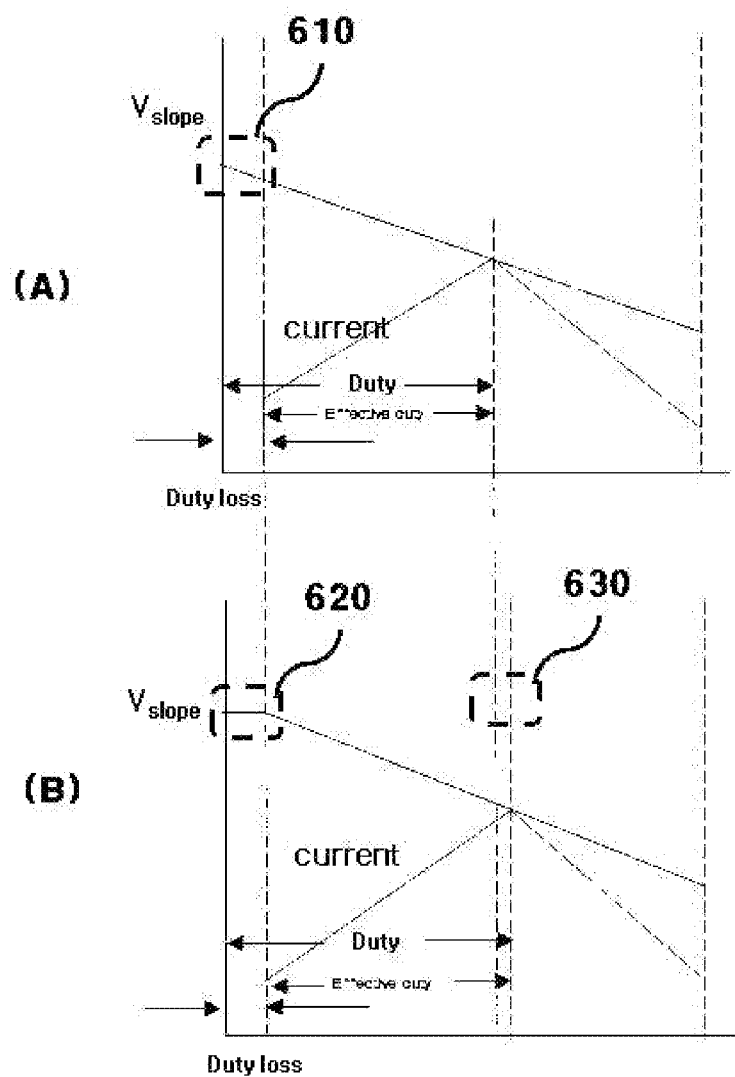

That is, the PWM signal is generated based on the difference between the load-side voltage and the reference voltage. The duty of a switch means the rate per period in which the switch is turned on by the PWM control signal: when the load-side voltage is less than the reference voltage, the duty increases; and when the load-side voltage becomes greater than the reference voltage, the duty decreases. The PWM signal, that is, the duty ratio may be determined using an analog IC method or a digital IC method. Each switch is turned on at every switching period and turned off when the current becomes greater than the reference value-slope Vslope to which the slope is applied to the reference value. The PWM signal is generated until the switch is on and off. As shown in FIG. 5, since the switch is turned off when the current becomes Vslope, the duty is formed at a time point when the current at which the switch is turned off meets Vslope.

At this time, when a duty loss occurs, the slope slope-Comp for controlling the peak current mode is affected by the duty loss as shown in FIG. 5(A). In an ideal case, the current rising time point and the slope rising time point are the same, but when a duty loss occurs, the slope rises or falls even though the current does not increase due to the duty loss. Due to this, the slope already has a predetermined value at the time point at which the actual current increases, and as a result, the time point at which the current meets Vslope becomes faster, so that the formation time point of the duty at which the switch is turned off is formed at a time point early from the rising time point of the current, thereby lowering the control stability. In particular, as the load increases, the duty loss increases and the slope value becomes larger at the current rising time point, so the switch can be turned off at a faster time point from the current rising time point. Since the switch is off at a fast time point from the rising time point of the current, the effective duty is reduced and it becomes difficult to sufficiently transfer to the secondary side even though it is possible to transfer more current to the secondary side by maintaining on state. That is, it operates with an effective duty less than the duty loss during the entire duty time.

By adaptively detecting and reflecting duty loss in real time, the effective duty can be increased, thereby increasing the efficiency of the converter. The controller 150 may vary the falling time point of the slope for controlling the peak current mode according to a change in the voltage of the secondary coil of the transformer 120 inputted from the sensor 140. At this time, the variation of the falling time point of the slope may be performed within the first period from the change in the voltage detected by the sensor 140. That is, it can be applied immediately within the same period.

As shown in FIG. 5(B), when the slope starts to descend after the time point at which the duty loss ends (620), the time point at which the current meets the slope is not reflected in the duty loss, and the slope falls at the same time as the duty starts (610) can be longer than that of FIG. 5(A). (630) That is, the time for which Q2 and Q3 are simultaneously turned on or the time for which Q1 and Q4 are simultaneously turned on may be varied and lengthened. This is same as lengthening the off time of Q1 or Q2 by varying it.

In addition, the controller 150 may vary the turn-off time of the rectifier switch according to a change in the voltage of the secondary coil of the transformer 120 inputted from the sensor 140. The controller 150 controls the rectifier switch 130 in synchronization with the switching operation of the switching unit 110. Using the AND switching method, the controller 150 operates Q6 to turn on when Q1 and Q4 are turned on at the same time to transfer power from the primary side to the secondary side, and may operate Q5 to turn on when Q2 and Q3 are turned on at the same time to transfer power from the primary side to the secondary side. This is a switching method that operates like an ideal diode. Or, the controller 150, by using the OR switching method, turns on Q6 when Q1 is turned on, turns off Q6 when Q4 is turned off, and may turn on Q5 when Q2 is turned on, and turn off Q5 when Q3 is turned off. It is a switching method that can optimize efficiency by allowing flow through FET, not diode, not only in the conduction period but also in the reflux period.

The controller 150 may detect a time point at which duty loss ends, and may vary the turn-off time of the rectifier switch 130. At this time, variation of the turn-off time of the rectifier switch 130 may be performed within the first period from the change in voltage detected by the sensor 140. That is, it can be applied immediately within the same period. By varying the turn-off time of the rectifier switch 130, it is possible to increase the efficiency by allowing the current to fully flow into the FET rather than the diode, which increases the effect as the load current increases.

Figure 6:
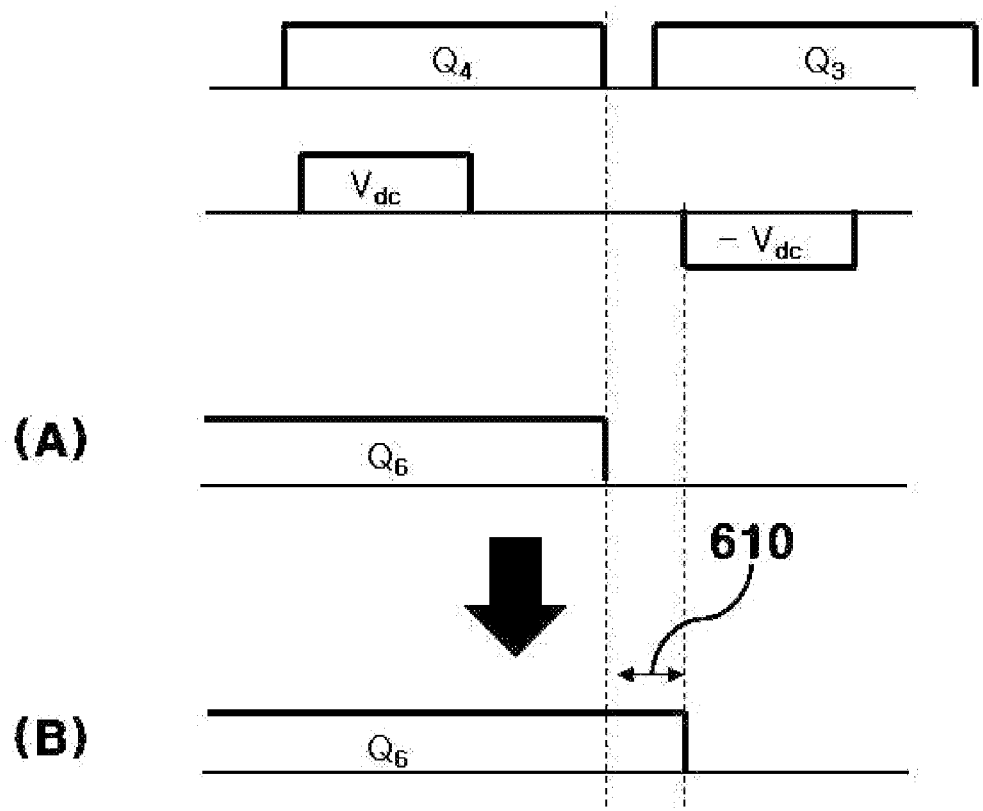

The controller 150 may calculate the duty loss and control the turn-off time of the rectifier switch 130 to be longer than the turn-off time of Q3 or Q4 as much as a first time according to the duty loss. As shown in FIG. 6, when Q4 is turned off and duty loss is not adaptively reflected, as shown in FIG. 6(A), Q6 is turned off in synchronization with Q4, but the controller 150 detects the time point at which the loss of duty ends, and as shown in FIG. 6(B), efficiency can be increased by controlling the off time of Q6 longer as much as the first time 610, that is, duty loss time.

Here, the first time may be equal to or less than the duty loss time. The controller 150 may control the first time as a duty loss time in order to maximize efficiency. However, the first time may not be controlled to be greater than the duty loss time. When control is performed by setting the first time equal to or longer than the duty loss time, a spike voltage may occur in the rectifier switch 130. As a matter of efficiency, the rectifier switch 130 uses a switch with a low withstand voltage, and when a spike voltage occurs, damage may occur, so the first time may be limited to be less than the duty loss time. That is, the turn-off time of the rectifier switch 130 may be before a predetermined voltage is applied to the primary side voltage of the transformer 120. As shown in FIG. 6, the turn-off time of the rectifier switch may be before the time when the voltage of −Vdc is applied to the primary side of the transformer. Since when the voltage of −Vdc is applied to the primary side of the transformer, damage to the rectifier switch may occur, it may be limited before the corresponding time.

When the first time is set shorter than the duty loss time, a margin may be applied. For example, it can be set to 90% of the duty loss time or 0.1 mec shorter than the duty loss time. In addition, the first time may be set in various ways.

The controller 150 may vary the pulse width modulation signal of the rectifier switch 130 according to the first time. The controller 150 may control the rectifier switch 130 through pulse width modulation control and send more pulse width modulated signals for a first time to delay the pulse width modulated signal of the rectifier switch 130.

The controller 150 may vary the turn-off time of the rectifier switch 130 using a ramp delay register. The controller 150, which is a microcontroller, may include a ramp delay register as an internal register.

As described above, by measuring the voltage of the secondary coil of the transformer 120, the time point at which the duty loss ends can be detected, and this can be adaptively reflected in real time and used to increase the efficiency of the converter. The controller 150 is located on the secondary side and detects the voltage of the secondary coil of the transformer 120, and does not require a separate insulation sensor, so it can be implemented with only a small number of resistors.

FIG. 7 is a block diagram of a converter according to another embodiment of the present invention. In the converter 200 according to another embodiment of the present invention, in detecting the time point at which the duty loss ends, it is different in that the sensor 140 detects the voltage of the rectifier switch rather than the voltage of the secondary coil of the transformer 120 and the related configurations thereof are different, and since other configurations correspond to the configurations of the converter according to one embodiment of the present invention of FIGS. 1 to 6, hereinafter, the converter and other configurations according to an embodiment of the present invention will be mainly described, and overlapping descriptions will be briefly explained.

The converter 200 according to another embodiment of the present invention is configured with a switching unit 110, a transformer 120, a rectifier switch 130, a sensor 140, and a controller 150.

The switching unit 110 is configured as a full bridge and performs a phase shift operation and the transformer 120 outputs a voltage being inputted from the switching unit 110 to a voltage of a predetermined level. The rectifier switch 130 including a first rectifier switch and a second rectifier switch is turned on and off according to the operation of the switching unit 110 to rectify the output signal of the transformer 120 and transfer it to the load.

The sensor 140 measures the voltage of the first rectifier switch or the second rectifier switch.

Figure 8:
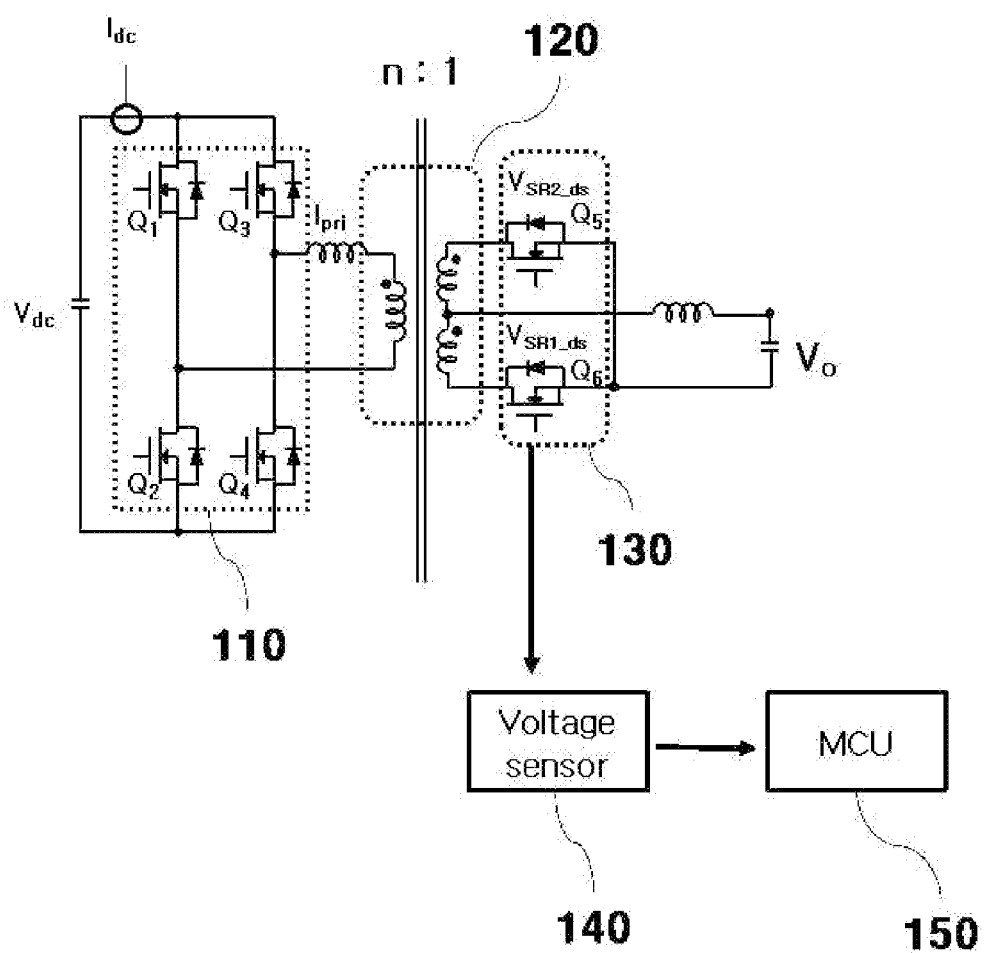
FIG. 8 is an exemplary circuit diagram of a converter according to another embodiment of the present invention.

More specifically, the sensor 140 detects the voltage of the first rectifier switch or the voltage of the second rectifier switch in order to detect the time point at which the duty loss ends. At this time, the sensor 140 may measure the drain-source voltage of the first rectifier switch or the drain-source voltage of the second rectifier switch. As shown in FIG. 8, the sensor 140 is implemented as a voltage sensor and can measure the drain-source voltage VSR1-ds of the first rectifier switch or the drain-source voltage VSR1-ds of the second rectifier switch. The measured voltage of the first rectifier switch or the second rectifier switch is outputted to the MCU 150 which is a controller.

Figure 9:
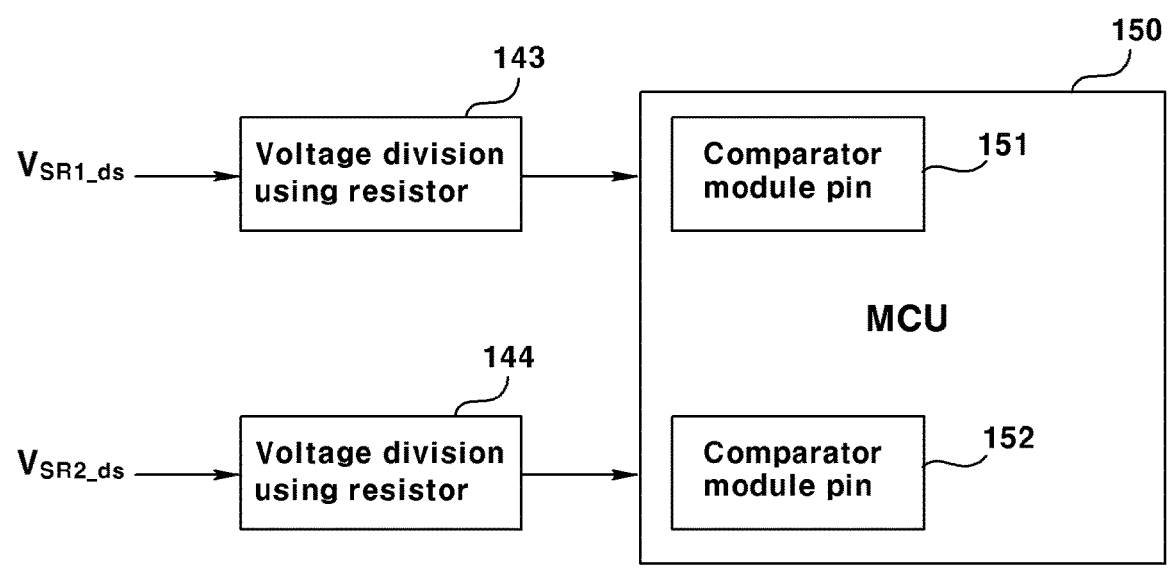
FIG. 9 is a block diagram of a sensor and a controller according to another embodiment of the present invention.

At this time, the sensor 140 may include a first resistor connecting the drain and source of the first rectifier switch and a second resistor connecting the drain and source of the second rectifier switch. As shown in FIG. 9, the sensor 140 can measure drain-source voltage of the first rectifier switch or drain-source voltage of the second rectifier switch through voltage division using the first resistor or the second resistor.

Figure 10:
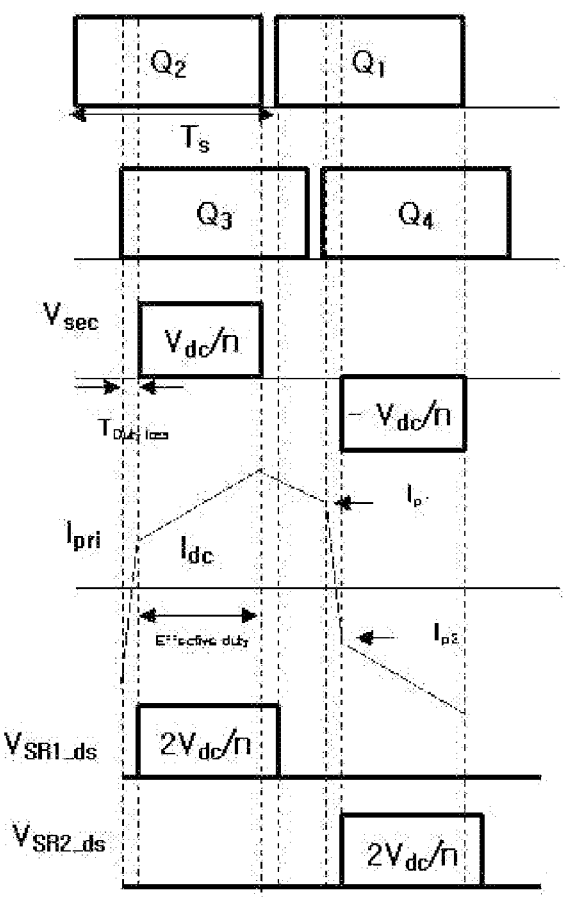
FIG. 10 is a diagram for explaining a process of reflecting a duty loss of a converter in real time according to another embodiment of the present invention.

The time point at which the duty loss ends can be detected through the drain-source voltage of the first rectifier switch or the drain-source voltage of the second rectifier switch. The voltage across the drain-source voltage of the first rectifier switch or the drain-source voltage of the second rectifier switch is shown in FIG. 10. After Q2 and Q3 are turned on, a voltage is induced in the second coil 122-2 of the secondary coil at the time point at which the duty loss ends, and a voltage is applied between the drain and source of the second rectifier switch Q6 connected to the second coil 122-2. At this time, the drain-source voltage of the second rectifier switch Q6 becomes 2Vdc/n.

After Q1 and Q4 are turned on, a voltage is induced in the first coil 122-1 of the secondary coil at a time point at which duty loss ends. When Q1 and Q4 are on, voltage is applied to the primary side of the transformer in an opposite direction from Q1 to Q4, that is, a direction from Q3 to Q2, and accordingly, a voltage is induced in the first coil 122-1, and a voltage is applied between the drain and source of the first rectifier switch Q5 connected to the first coil 122-1. At this time, the drain-source voltage of the first rectifier switch Q5 becomes 2Vdc/n.

That is, the drain-source voltage of the first rectifier switch or the drain-source voltage of the second rectifier switch becomes 2Vdc/n at the time point at which the duty loss ends, and by detecting the time point (edge) when the drain-source voltage of the first rectifier switch or the drain-source voltage of the second rectifier switch rises from 0 V to 2Vdc/n, the time point at which duty loss ends can be accurately detected.

The controller 150 receives the voltage of the first rectifier switch or the second rectifier switch from the sensor 140 and generates a control signal controlling the switching unit 110, the first rectifier switch, or the second rectifier switch according to the change in the voltage of the first rectifier switch or the second rectifier switch. The controller 150 controls the switching operation of the switching unit 110 in a peak current mode by measuring the voltage and input current of the load, and can vary the falling time point of the slope for controlling the peak current mode according to the change in the voltage of the first rectifier switch or the second rectifier switch received from the sensor 140. In addition, the controller 150 may vary the turn-off time of the first rectifier switch or the second rectifier switch according to the change in the voltage of the first rectifier switch or the second rectifier switch received from the sensor 140.

The converter 200 according to another embodiment of the present invention, as described above, can detect the time point at which the duty loss ends by measuring the voltage of the first rectifier switch or the second rectifier switch, and this can be adaptively reflected in real time and used to increase the efficiency of the converter. The controller 150 is located at the secondary side and detects the voltage of the first rectifier switch or the second rectifier switch located at the secondary side of the transformer 120, so it does not require a separate isolation sensor, so it can be implemented with only a small number of resistors. In addition, when detecting an edge, only a rising edge is detected, and since the control operation is performed by detecting the rising edge using the comparator inside the MCU which is a controller, an immediate response is possible. That is, the dynamic characteristics are excellent.

FIG. 11 is a block diagram of a converter according to yet another embodiment of the present invention. A converter 300 according to yet another embodiment of the present invention, in detecting the time point at which the duty loss ends, is different in that the sensor 140 detects the voltage of the primary coil of the transformer 120, not the voltage of the secondary coil or the voltage of the rectifier switch of the transformer 120, and the related configurations thereof are different, and since other configurations correspond to the configurations of the converter according to one embodiment of the present invention of FIGS. 1 to 6 or the converter according to another embodiment of the present invention of FIGS. 7 to 10, hereinafter, the converter and other configurations according to one embodiment or another embodiment of the present invention will be mainly described, but overlapping descriptions will be briefly described.

The converter 300 according to yet another embodiment of the present invention is configured with a switching unit 110, a transformer 120, a rectifier switch 130, a sensor 140, and a controller 150.

The switching unit 110 is configured as a full bridge and performs a phase shift operation and the transformer 120 outputs a voltage being inputted from the switching unit 110 to a voltage of a predetermined level. The rectifier switch 130 including the first rectifier switch and the second rectifier switch is turned on and off according to the operation of the switching unit 110 to rectify the output signal of the transformer 120 and transfer it to the load.

The sensor 140 measures the voltage of the primary coil of the transformer 120.

Figure 12:
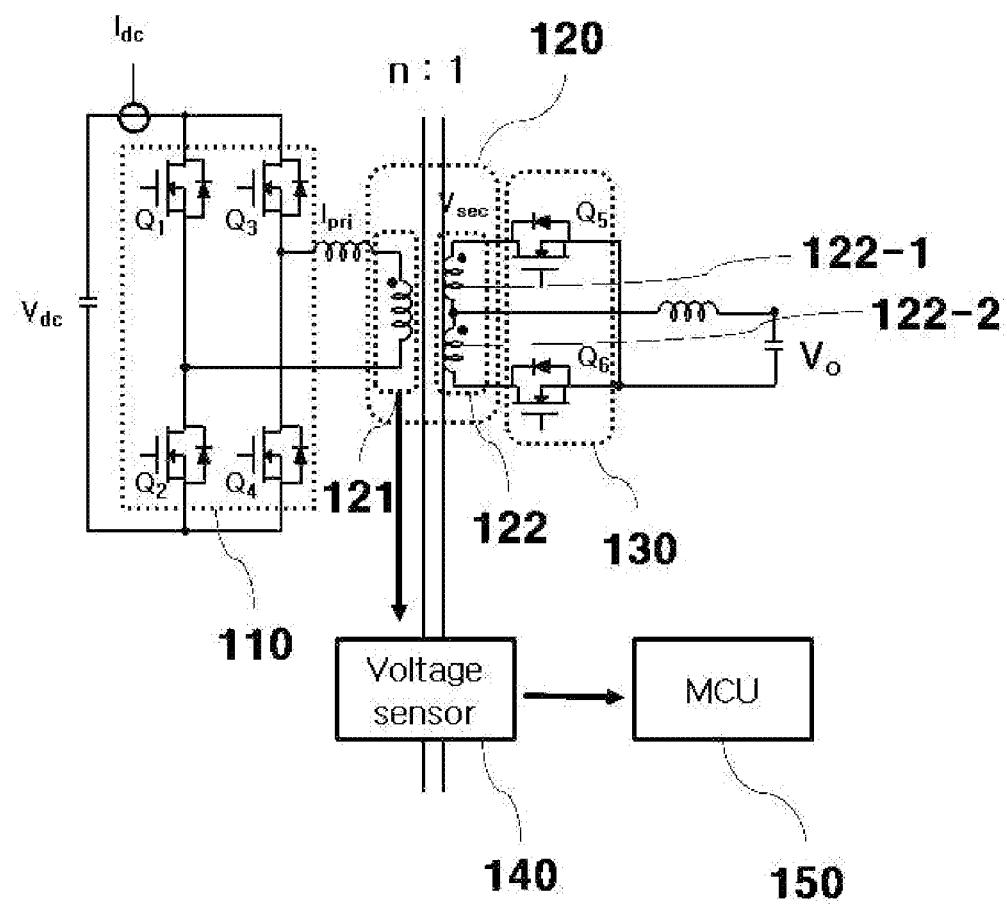
FIG. 12 is an exemplary circuit diagram of a converter according to yet another embodiment of the present invention.
Figure 13:
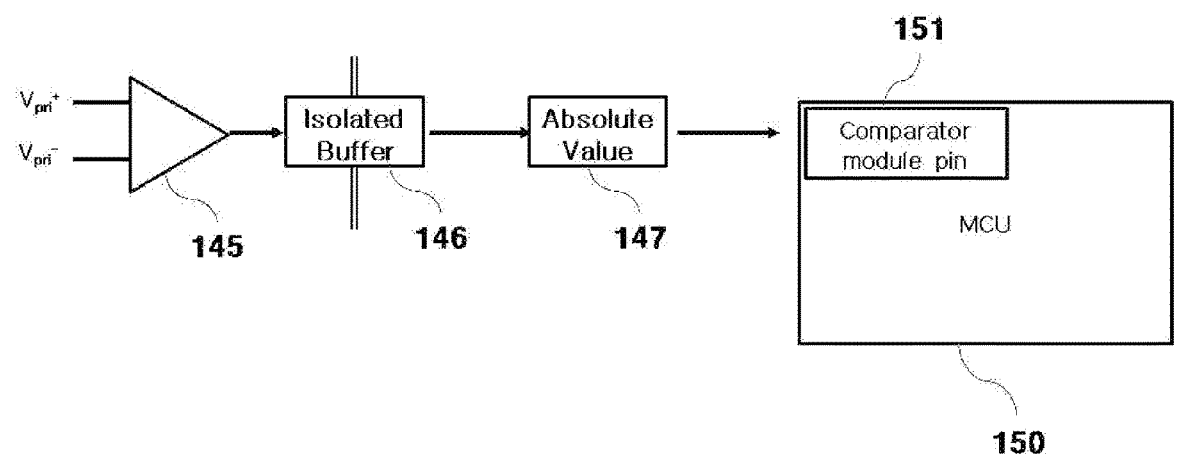
FIG. 13 is a block diagram of a sensor and controller according to yet another embodiment of the present invention.

More specifically, the sensor 140 detects the voltage of the primary coil of the transformer 120 in order to detect the time point at which the duty loss ends. As shown in FIG. 12, the sensor 140 is implemented as a voltage sensor and can measure the voltage of the primary coil of the transformer 120. The measured voltage of the primary coil of the transformer 120 is outputted to the MCU 150 which is a controller. The sensor 140 should measure the voltage on the primary side of the transformer and output the voltage measured by the controller 150 located on the secondary side, so it can be configured as an isolation sensor. As shown in FIG. 13, the sensor 140 may include: a third differential amplifier 145 that amplifies and outputs the difference between the voltages of both ends of the primary coil of the transformer 120; and an isolated buffer 146 that transfers the output value of the third differential amplifier 145 to the controller 150 located at the secondary side. The corresponding value is converted into an absolute value 147 and inputted to the MCU 150 which is a controller.

Figure 14:
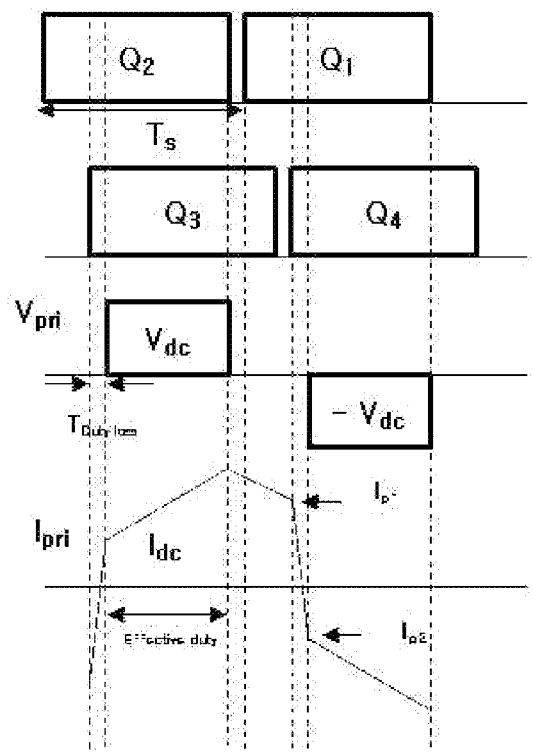
FIG. 14 is a diagram for explaining a process of reflecting a duty loss of a converter in real time according to yet another embodiment of the present invention.

The time point at which the loss of duty ends can be detected through the voltage of the primary coil of the transformer. The voltage of the primary coil of the transformer is shown in FIG. 14. After Q2 and Q3 are turned on, the transformer primary coil is applied with a voltage at the time point at which the duty loss ends. At this time, the voltage of the transformer primary coil 121 becomes Vdc.

After Q1 and Q4 are turned on, a voltage is applied to the transformer primary coil at the time point at which the duty loss ends. When Q1 and Q4 are turned on, a voltage is applied to the primary side of the transformer in an opposite direction from Q1 to Q4, that is, the direction from Q3 to Q2, and accordingly, a voltage is applied to the transformer primary coil, and the voltage of the transformer primary coil becomes −Vdc.

That is, since the voltage of the transformer primary coil becomes Vdc or −Vdc at the time point at which the duty loss ends, the time point at which duty loss ends can be accurately detected by detecting the time point (edge) where the voltage of the transformer primary coil rises from 0 V to Vdc, or by detecting the time point (edge) falling from 0 V to −Vdc.

The controller 150 receives the voltage of the first rectifier switch or the second rectifier switch from the sensor 140, and generates control signals controlling the switching unit 110, the first rectifier switch, or the second rectifier switch according to the change in the voltage of the first rectifier switch or the second rectifier switch. The controller 150 controls the switching operation of the switching unit 110 in a peak current mode by measuring the voltage and input current of the load, and may vary the falling time point of the slope for controlling the peak current mode according to a change in the voltage of the primary coil of the transformer inputted from the sensor 140. In addition, the controller 150 may vary the turn-off time of the rectifier switch according to a change in the voltage of the primary coil of the transformer inputted from the sensor 140.

As described above, the converter 300 according to another embodiment of the present invention can detect the time point at which the duty loss ends by measuring the voltage of the primary coil of the transformer, and adaptively reflect it in real time to increase the efficiency of the converter. Since the controller 150 is located on the secondary side and detects the voltage of the coil located on the primary side of the transformer 120, an additional circuit for implementing an isolation voltage sensor is required. By implementing voltage measurement with an isolation voltage sensor IC, duty loss can be adaptively reflected in real time.

Figure 15:
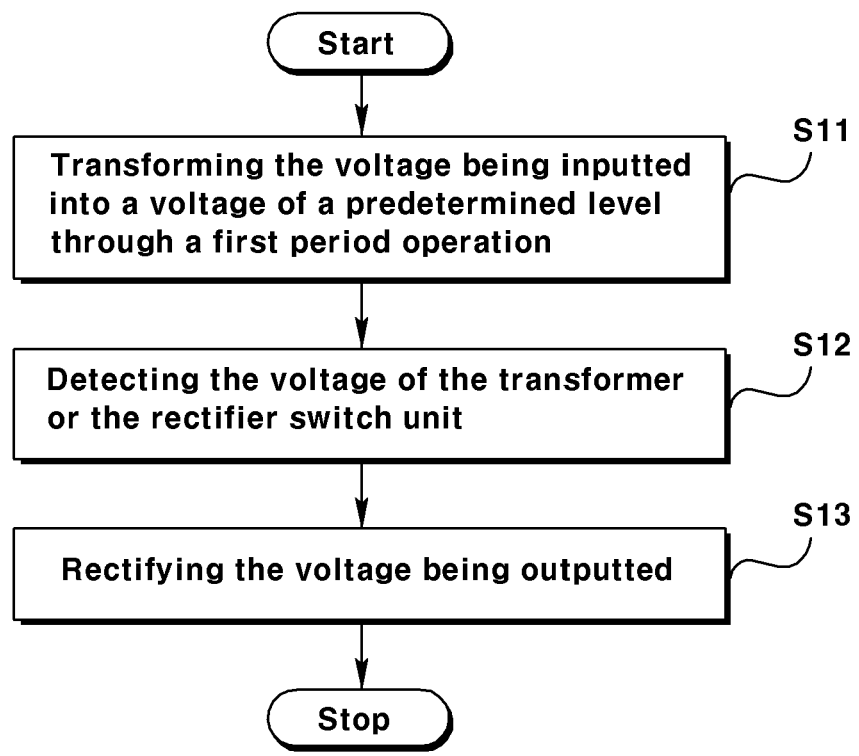
FIG. 15 is a flowchart of a method controlling a converter according to an embodiment of the present invention.

FIG. 15 is a flowchart of a method for controlling a converter according to an embodiment of the present invention. The detailed description of each step of FIG. 15 corresponds to the detailed descriptions of the converter of FIGS. 1 to 14, and thus, overlapping descriptions will be omitted.

A method for controlling a converter according to an embodiment of the present invention, in the control method of a converter comprising a transformer and a rectifier switch electrically connected to the transformer, a voltage being inputted is transformed into a voltage of a predetermined level through a first period operation in step S11, the voltage of the transformer or the rectifier switch unit is detected in step S12, and the voltage being outputted is rectified in step S13, wherein the switching operation state of the rectifier switch is controlled within the first period from the rising time point or falling time point of the detected voltage. Or, it is possible to control the switching operation state of the switching unit of the transformer within the first period from the rising time point or falling time point of the detected voltage.

Those skilled in the art related to the present embodiment will be able to understand that it may be implemented in a modified form within a range that does not deviate from the essential characteristics of the above description. Therefore, the disclosed methods should be considered from an explanatory point of view, not from a limited point of view. The scope of the present invention is shown in the claims rather than the foregoing description, and all differences within the equivalent scope will be construed as being included in the present invention.

The invention claimed is:

1. A converter comprising:
a switching unit comprising a plurality of switches;
a transformer connected to the switching unit;
a rectifier switch connected to the transformer;
a sensor connected to a primary coil of the transformer, a secondary coil of the transformer, or the rectifier switch; and
a controller configured to control converting operation of the converter,
wherein the rectifier switch comprises a first rectifier switch and a second rectifier switch connected in parallel to each other,
wherein the secondary coil of the transformer comprises a first coil connected in series with the first rectifier switch and a second coil connected in series with the second rectifier switch,
wherein the sensor measures voltage of voltage of the first coil and voltage of the second coil,
wherein the sensor comprises:
a first differential amplifier amplifying a voltage difference between both ends of the first coil and applying the amplified voltage to the controller; and
a second differential amplifier for amplifying a voltage difference between both ends of the second coil and applying the amplified voltage to the controller.

2. The converter according to claim 1,
wherein the sensor measures a drain-source voltage of the first rectifier switch or a drain-source voltage of the second rectifier switch.

3. The converter according to claim 2, wherein turn-off time of the first rectifier switch or the second rectifier switch is varied according to change in voltage of the first rectifier switch or the second rectifier switch inputted from the sensor.

4. The converter according to claim 2,
wherein turn-off time of the first rectifier switch or the second rectifier switch is varied according to change in voltage of the primary coil of the transformer or change in voltage of the secondary coil of the transformer.

5. The converter according to claim 1,
wherein the sensor comprises:
a third differential amplifier amplifying a difference in voltages of both ends of the primary coil of the transformer and outputting it; and
an insulation buffer transferring output value of the third differential amplifier to the controller.

6. The converter according to claim 1,
whererin the controller controls a switching operation of the switching unit in a peak current mode,
wherein the controller varies a falling time point of a slope for controlling the peak current mode according to change in voltage of the primary coil of the transformer, the secondary coil of the transformer, or the rectifier switch inputted from the sensor.

7. A converter comprising:
a switching unit;
a transformer changing voltage outputted from the switching unit;
a rectifier switch rectifying output voltage of the transformer;
a sensor detecting voltage of a primary coil of the transformer, a secondary coil of the transformer, or the rectifier switch; and
a controller configured to control converting operation of the converter,
wherein the rectifier switch is turned off according to a rising time point or a falling time point of the voltage of the primary coil of the transformer, the secondary coil of the transformer, or the rectifier switch,
wherein the rectifier switch comprises a first rectifier switch and a second rectifier switch connected in parallel to each other,
wherein the secondary coil of the transformer comprises a first coil connected in series with the first rectifier switch and a second coil connected in series with the second rectifier switch,
wherein the sensor measures at least one voltage of voltage of the first coil and voltage of the second coil,
wherein the sensor comprises:
a first differential amplifier amplifying a voltage difference between both ends of the first coil and applying the amplified voltage to the controller; and
a second differential amplifier for amplifying a voltage difference between both ends of the second coil and applying the amplified voltage to the controller.

8. The converter according to claim 7,
wherein the controller calculates in a period of a first time, and
wherein when a sensing time point of the sensor is changed according to a size change of a load being electrically connected to the rectifier switch, an on/off state change time point of the rectifier switch is also changed within the first time.

9. The converter according to claim 7, wherein the switching unit is formed of full bridge and operates phase shift.

10. The converter according to claim 7, wherein the rectifier switch is turned on when a synchronized switch among switches comprised in the switching unit is turned on.

11. The converter according to claim 7, wherein the controller controls switching operation of the switching unit in a peak current mode by measuring voltage and input current of a load, and varies a falling time point of a slope for controlling the peak current mode according to change in voltage of the first rectifier switch or the second rectifier switch inputted from the sensor.

12. The converter according to claim 7, wherein the controller controls switching operation of the switching unit in a peak current mode by measuring voltage and input current of a load, and varies a falling time point of a slope for controlling the peak current mode according to change in voltage of the primary coil of the transformer, the secondary coil of the transformer, or the rectifier switch inputted from the sensor.

13. The converter according to claim 7, wherein the controller varies a turn-off time of the rectifier switch according to change in voltage of the primary coil of the transformer, the secondary coil of the transformer, or the rectifier switch inputted from the sensor.

14. A method for controlling a converter according to claim 7, the method comprising:

transforming an input voltage into a voltage of a predetermined level through a first period operation;
detecting a voltage of the transformer or the rectifier switch unit; and
rectifying an output voltage being outputted,
wherein switching operation state of the rectifier switch is controlled within the first period from a rising time point or a falling time point of the voltage that has been detected.

15. The method for controlling a converter according to claim 14, wherein switching operation state of the rectifier switch is controlled in a peak current mode by measuring voltage and input current of a load, and0
wherein a falling time point of a slope for controlling the peak current mode is varied according to change in voltage of the rectifier switch.

16. The method for controlling a converter according to claim 14, wherein switching operation state of the rectifier switch is controlled in a peak current mode by measuring voltage and input current of a load, and
wherein a falling time point of a slope for controlling the peak current mode is varied according to change in voltage of a primary coil of the transformer, a secondary coil of the transformer, or the rectifier switch inputted from the sensor.

17. The method for controlling a converter according to claim 14, wherein a turn-off time of the rectifier switch is varied according to change in voltage of a primary coil of the transformer, a secondary coil of the transformer, or the rectifier switch.

* * * * *